United States Patent [19]
Miyazaki

[11] Patent Number: 5,791,576
[45] Date of Patent: Aug. 11, 1998

[54] CLUTCH MECHANISM FOR A DOUBLE BEARING TYPE REEL FOR FISHING

[75] Inventor: Takeo Miyazaki, Tokyo, Japan

[73] Assignee: Daiwa Seiko, Inc., Tokyo, Japan

[21] Appl. No.: 560,118

[22] Filed: Nov. 17, 1995

[30] Foreign Application Priority Data

Nov. 17, 1994 [JP] Japan .................. 6-015280 U

[51] Int. Cl.$^6$ .................................. A01K 89/015
[52] U.S. Cl. .................................. 242/261
[58] Field of Search .................. 242/260, 261, 242/262, 259

[56] References Cited

FOREIGN PATENT DOCUMENTS

| 62-164772 | 10/1987 | Japan | .................. A01K 89/015 |
| 5-176662 | 7/1993 | Japan | .................. A01K 89/015 |

OTHER PUBLICATIONS

Model of Spool Component for Millionaire 3RM Baitcasting Reel and Drawing Figure thereof (publically known from 1980).

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

In a double bearing type reel for fishing, an engaging portion is formed in a spool shaft which can be engaged with an engaging portion formed in a pinion gear slidably fitted with the spool shaft. Further, chamfered surfaces which widen outwardly from each of two boundary lines between mutually opposing cylindrical peripheral surfaces and mutually opposing slitted portions of the engaging portion are provided. The engaging operation of the pinion gear can be executed smoothly due to the rotation action of the pinion gear as well as due to the induction actions of the chamfered portions.

18 Claims, 6 Drawing Sheets

CLUTCH MECHANISM FOR A DOUBLE BEARING TYPE REEL FOR FISHING

BACKGROUND OF THE INVENTION

The present invention relates to an improved clutch mechanism for use in a double bearing type reel for fishing.

In a double bearing type reel for fishing, as disclosed in Japanese Utility Model Publication No. 62-164772 of Showa, in order to switch a spool between a fishline take-up state and a free state in which the fishline can be played out, there is provided a clutch mechanism which is used to engage a slitted engaging portion in a pinion gear with a slitted engaging portion in a spool shaft and disengage the former engaging portion from the latter engaging portion. In this structure, however, when the spool is returned from the fishline play-out state back to the fishline take-up state, the engagement of the spool can be attained only when the engaging portion of the spool shaft and the engaging portion of the pinion gear are in alignment with each other, so that the engaging operation of the pinion gear with the spool shaft by returning the spool to the take-up state cannot be performed smoothly and quickly. Especially in the engaging operation of the clutch mechanism when the spool is rotating at high speeds, there is a danger that the pinion engaging portion can be broken. In view of this, in order to improve such drawbacks, as is disclosed in Japanese Patent Publication No. 5-176662 of Heisei, a structure have been developed in which an inclined surface is formed in the opening end face of the engaging portion of the pinion gear to thereby facilitate the engagement of the spool shaft.

However, since the spool shaft is normally formed of hard metal such as stainless steel or the like and the pinion gear is made of relatively soft metal such as phosphor bronze, brass or the like which is easy to work, the formation of such inclined surface or the like in the engaging portion of the pinion gear as in the above-mentioned well-known structure lowers the strength and durability of the engaging portion of the pinion gear, so that the engaging and disengaging operations by the clutch mechanism cannot be executed smoothly and positively for a long period of time.

SUMMARY OF THE INVENTION

Accordingly, it is an object of the invention to provide a clutch mechanism for use in a double bearing type fishing reel which improves the above-mentioned problems to thereby be able to carry out the engaging operation between the spool shaft and pinion gear smoothly and positively are a long period of time.

In attaining the above object, according to the invention, there is provided a double bearing type reel for fishing in which a pinion gear to be rotated by manually rotating a handle shaft can be engaged with or disengaged from a spool shaft including a spool by a clutch mechanism, characterized in that the spool shaft includes an engaging portion engageable with an engaging portion formed in the pinion gear, the engaging portion of the spool shaft being composed of slitted portions and cylindrical peripheral surface portions, and the spool shaft further includes, in the boundary lines between the slitted portions and cylindrical peripheral surface portions of the engaging portion in the rotational direction thereof, a chamfered portion extending outwardly from the neighboring portion of the opening end of the engaging portion of the pinion gear when the spool shaft engaging portion is in engagement with the pinion gear engaging portion. The chamfered portion may be formed in a plurality of plane surfaces between the slitted portions and peripheral surface portions or may be formed in a curved surface extending continuously from the slitted portion to the peripheral surface portion.

Also, the outer end edge of the chamfered portion is formed in the range of 90 degrees or more exceeding not only a straight line passing through the center of the cylindrical peripheral surface portion of the engaging portion of the spool shaft and the axis of the spool shaft but also a straight line intersecting the above straight line at right angles and passing through the axis of the spool shaft. The starting end portion of the outer end edge starts at a position substantially opposed to the opening end of the engaging portion of the pinion gear in the boundary line between the slitted portion and cylindrical peripheral surface portion and, in most cases, preferably, the starting end portion of the outer end edge may be positioned slightly inside the opening end of the engaging portion of the pinion gear.

In order to switch the spool from the fishline play-out state over to the fishline take-up state, if the handle is rotated to thereby rotate the pinion gear and move the engaging portion of the pinion gear toward the engaging portion of the spool shaft, then, even when the position of the engaging portion of the pinion gear is not coincident with the position of the engaging portion of the spool shaft, the engaging portion of the pinion gear can be engaged smoothly with the engaging portion of the spool shaft due to the action of rotation of the engaging portion of the pinion gear as well as due to the inducing action of the chamfered portion of the engaging portion of the spool shaft, so that the pinion gear can be connected integrally with the spool shaft and thus the spool shaft can be driven.

DETAILED DESCRIPTION OF THE PREFERRED EMBODIMENTS

Now, description will be given below of an embodiment of a double bearing reel for fishing with reference to the accompanying drawings. A spool 1 is fixed to a spool shaft 2 which is rotatably supported between reel side plates 3 and 4. The spool shaft 2 includes a small diameter shaft portion 2' over which a pinion gear engaged with a yoke 6 of a well known clutch mechanism 5 is slidably fitted. Further, the spool shaft 2 includes in the base portion of the small diameter shaft portion 2' an engaging portion 9 which can be engaged into an engaging portion 8 formed in the pinion gear 7.

Referring now to the structure of the above-mentioned clutch mechanism, as known well, a clutch plate 11 to be operated by a clutch lever 10 holds the yoke 6 at an outward position against a spring 12 to disengage the pinion gear 7 from the engaging portion 9 of the spool shaft 2. Also, by rotating a handle shaft 13 in the fishline take-up direction, the clutch plate 11 is returned through an automatic return mechanism 14 to its engaging position. Thus the engaging portion 8 of the pinion gear 7 engages with the engaging portion 9 of the spool shaft 2 by the yoke 6 which is energized by operation of the spring 12.

Figure 8:
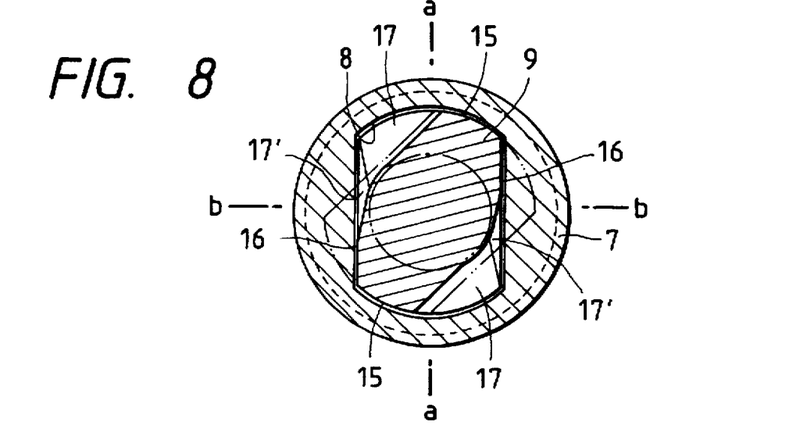
FIG. 8 is a longitudinally sectional side view of FIG. 7.
Figure 9:
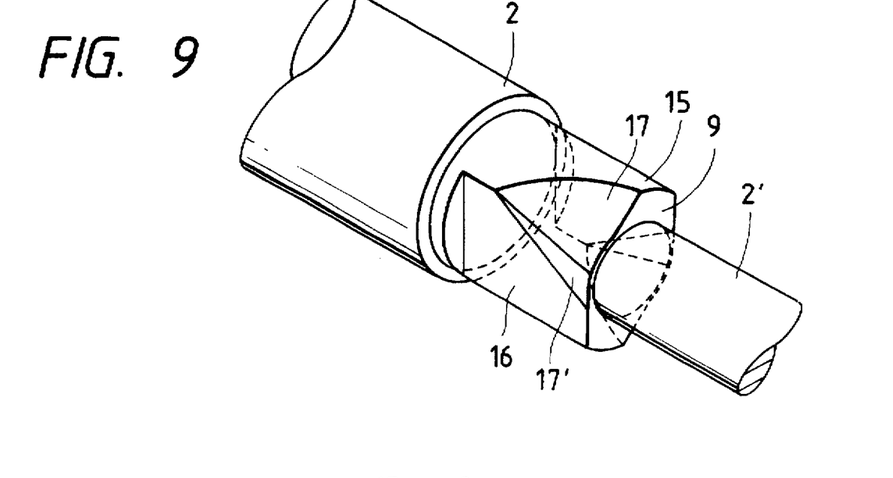
FIG. 9 is a perspective view of the main portions of the above embodiment of the invention.
Figure 13:
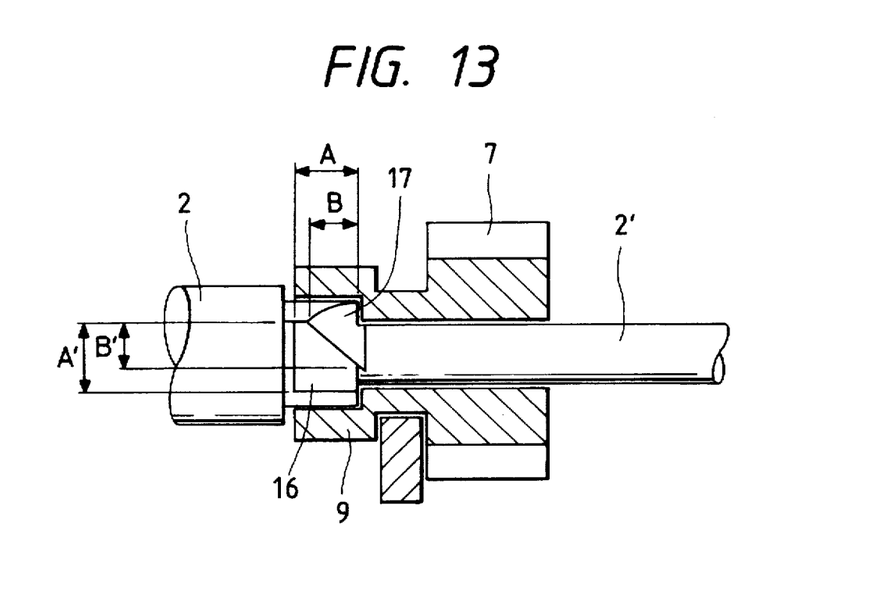
FIG. 13 is a partially cutaway front view of another embodiment of a double bearing type reel for fishing according to the invention, showing a state in which the clutch part is in engagement.
Figure 14:
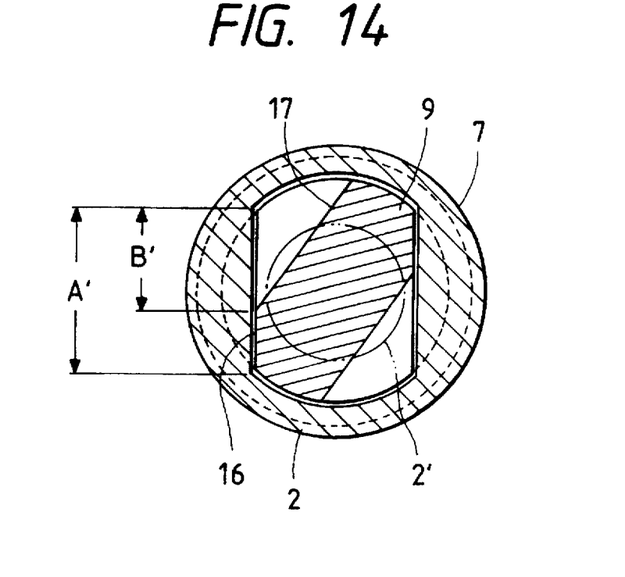
FIG. 14 is a longitudinally sectional side view of FIG. 13.
Figure 15:
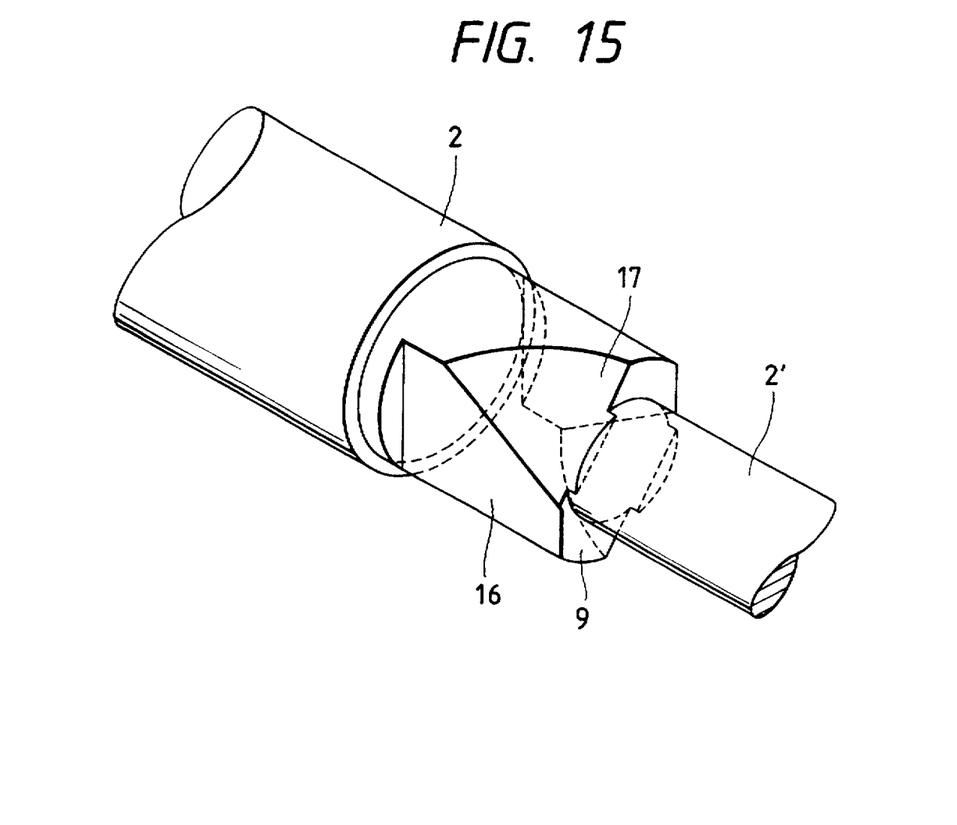
FIG. 15 is a perspective view of the main portions of the third embodiment of the invention.

Also, the engaging portion 9 of the spool shaft 2 includes a pair of mutually opposing cylindrical peripheral surface portions 15 opposed to each other in a radial direction, and a pair of slitted planar portions 16, each situated between the peripheral surface portions 15 in a circumferential or rotational direction. The engaging portion 9 of the spool shaft 2 further includes, in each boundary between the peripheral surface portion 15 and slitted portion 16 in the rotational direction, a pair of plane-surface-shaped chamfered portions 17 and 17'. Each of the chamfered portions 17 and 17' has a substantially triangular shape extending from a position located in the vicinity of a proximal end of the slitted portion 16 and enlarged toward an axial terminus of the engaging portion 9. When the engaging portion 8 of the pinion gear 7 is completely fitted with the engaging portion of the spool shaft, the chamfered portions 17 and 17' are located within the the engaging portion 8 of the pinion gear 7. Each of the chamfered portions 17 and 17' is slanted with respect to a plane orthogonal to a rotational axis of the spool shaft 2. Each pair of the chamfered portions 17 and 17' at the axial terminus of the engaging portion 9 shares an angular space greater than 90 degrees with respect to the rotational axis as shown in FIG. 8. That is, each pair extends beyond not only a straight line a—a passing through the center of the cylindrical peripheral surface portion 15 and the axis of the spool shaft but also a straight line, b—b intersecting the above straight line at right angles and passing through the axis of the spool shaft. Each pair of the chamfered portions 17 and 17' may be formed in a single curved surface 17 (FIGS. 10, 11 and 12) or a single planar surface 17 (FIGS. 13, 14 and 15), which extends continuously between the cylindrical peripheral surface portion 15 and slitted portion 16. In addition, the modification where the single planar surface 17 is provided as the chamfered portion as shown in FIGS. 13, 14 and 15 is advantageous in that the machining for forming the chamfered portion can be simplified. In the embodiment shown in FIGS. 13, 14 and 15, the planar chamfered portion 17 extends beyond the axial terminus of the engaging portion 9. However, alternatively, the planar chamfered portion may terminate at the axial terminus of the engaging portion 9.

Figure 1:
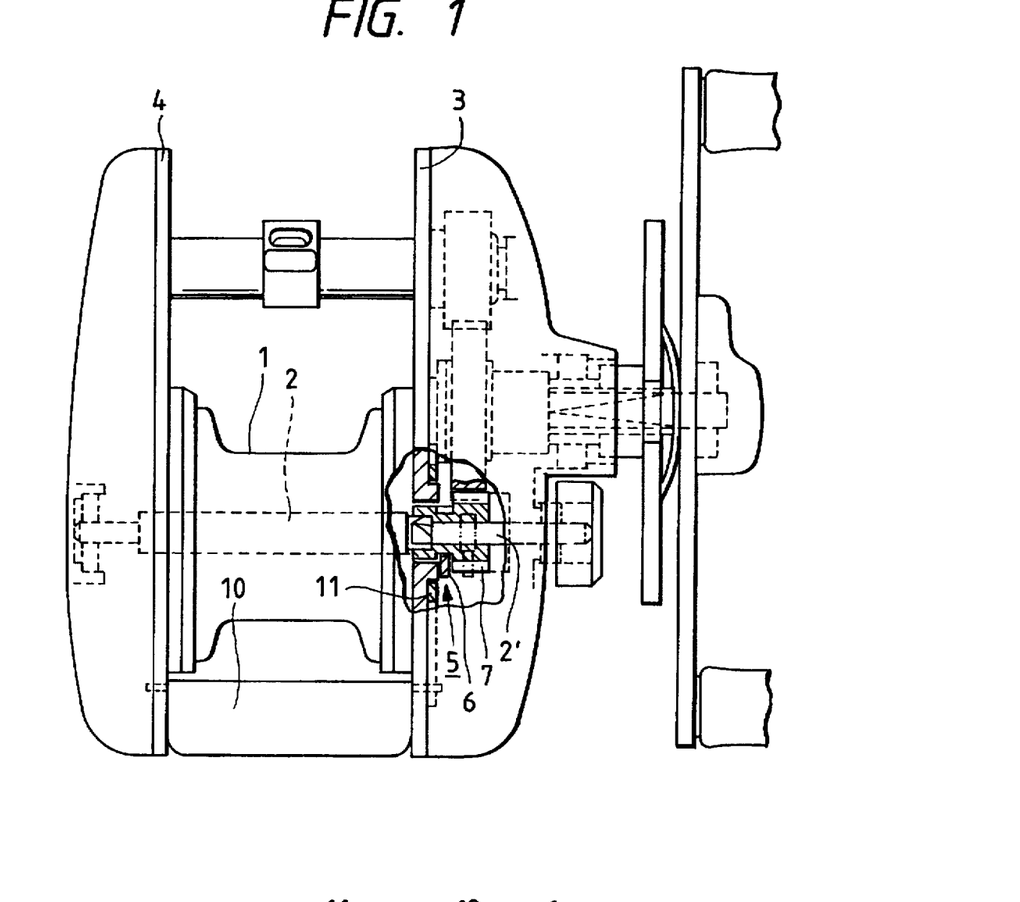
FIG. 1 is a partially cutaway plan view of an embodiment of a double bearing type reel for fishing according to the invention.
Figure 2:
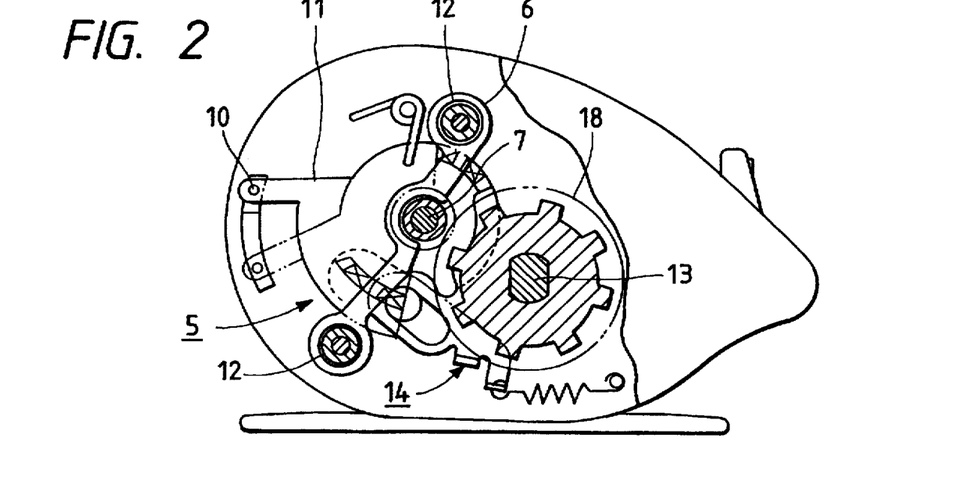
FIG. 2 is a partially cutaway side view of the reel shown in FIG. 1.
Figure 3:
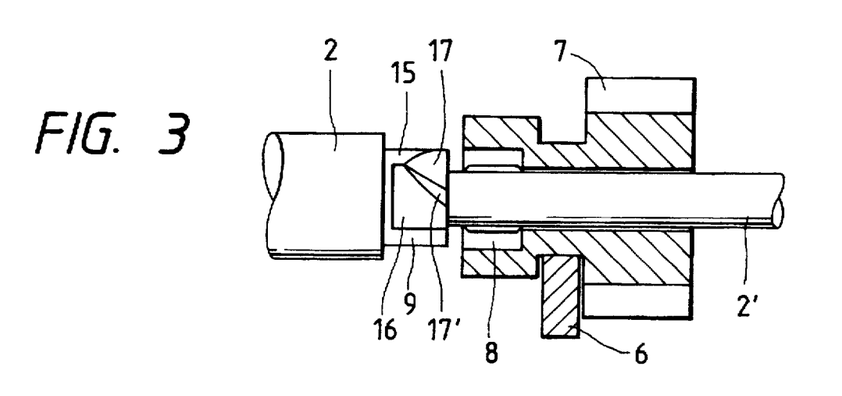
FIG. 3 is a partially cutaway front view of a clutch part employed in the embodiment shown in FIG. 1, showing a state in which the clutch part is engaged.
Figure 4:
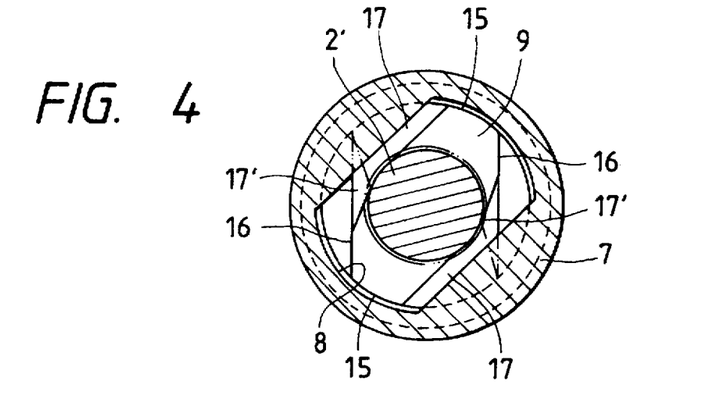
FIG. 4 is a longitudinally sectional side view of the clutch part shown in FIG. 3.
Figure 5:
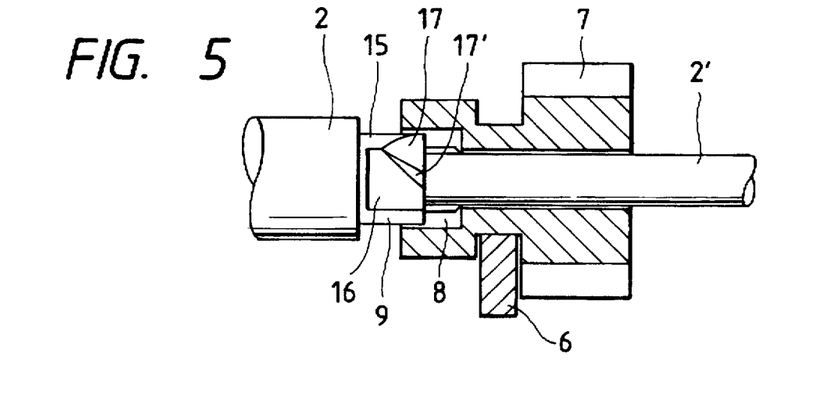
FIG. 5 is a partially cutaway front view of the clutch part shown in FIG. 3, showing a state in which the clutch part is being engaged.
Figure 6:
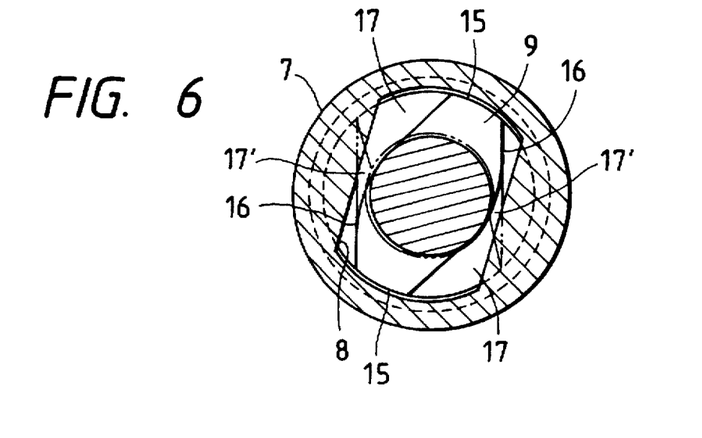
FIG. 6 is a longitudinally sectional side view of the clutch part shown in FIG. 5.
Figure 7:
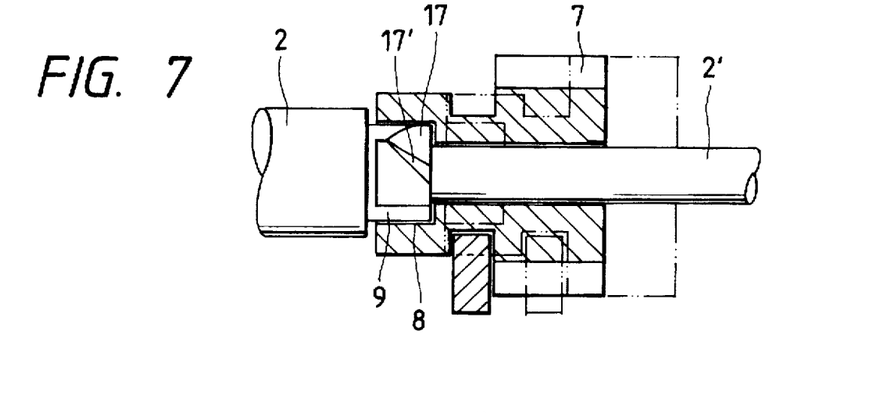
FIG. 7 is a partially cutaway front view of the clutch part when it is in engagement.

In addition, in FIG. 2, reference character 18 designates a drive gear provided on the handle shaft 13 which is engageable with the pinion gear 7. Also, according to the present embodiment, the pinion gear 7 is formed of material having a relatively low strength such as brass, phosphor bronze or the like, while the engaging portion of the spool shaft is formed of material having a relatively high strength such as stainless steel or the like.

Since the present embodiment is structured in the above-mentioned manner, in the fishline play-out condition, in which the engaging portion 8 of the pinion gear 7 is disengaged from the engaging portion 9 of the spool shaft 2, if the handle shaft 13 is rotated in the fishline take-up direction, then the pinion gear 7 is pressure-fed toward the engaging portion 9 of the spool shaft 2 by the clutch plate 11 of the clutch mechanism 5 through the automatic return mechanism 14. One to the rotation action of the pinion gear 7 as well as due to the inducing guide action of the chamfered portions 17 and 17' of the engaging portion 9, the engaging portion 8 engages with the engaging portion 9, as shown in from FIGS. 5 and 6 to FIGS. 7 and 8. Thus the pinion gear 7 connects integrally with the spool shaft 2, thereby rotating the spool 1.

In the present invention, the engaging portion of the spool shaft is engageable with the engaging portion of the pinion gear. Also the chamfered portion is enlarged axially from the boundary line between the cylindrical peripheral surface portion of the engaging portion and the slitted portion toward the engaging portion of the pinion gear. As a result, the engaging operation of the spool shaft and pinion gear can be carried out smoothly and positively even during high-speed rotation of the spool. Also, because the engaging portion of the pinion gear is made of a material that is easily workable and has a low strength such as brass, phosphor bronze or the like the described embodiment prevents, the engaging portion of the pinion gear from wearing and breaking thereby improving the durability of the pinion gear in durability.

Figure 10:
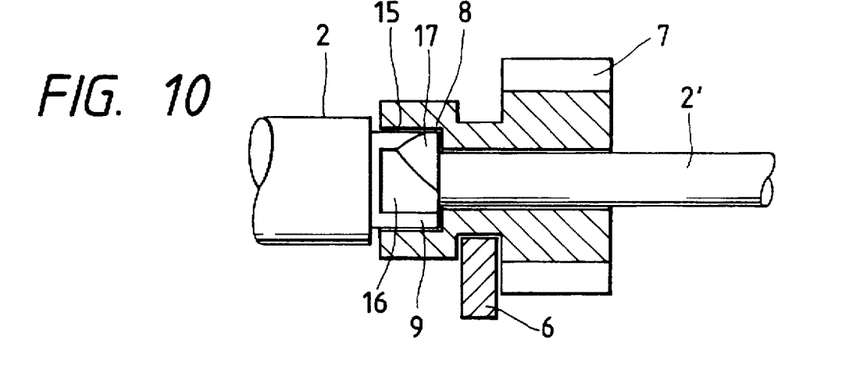
FIG. 10 is a partially cutaway front view of another embodiment of a double bearing type reel for fishing according to the invention, showing a state in which the clutch parts is in engagement.
Figure 11:
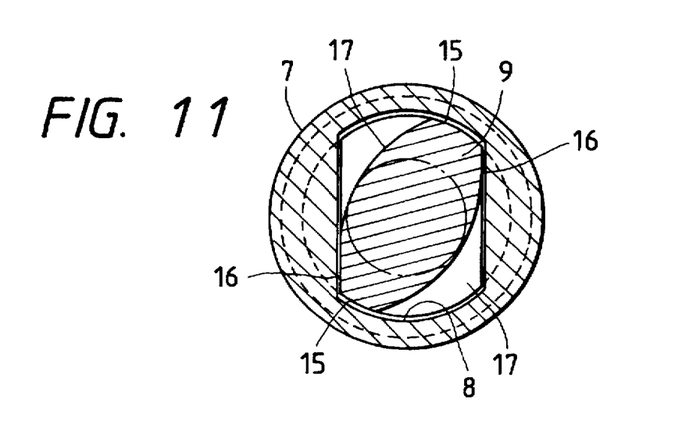
FIG. 11 is a longitudinally sectional side view of FIG. 10.
Figure 12:
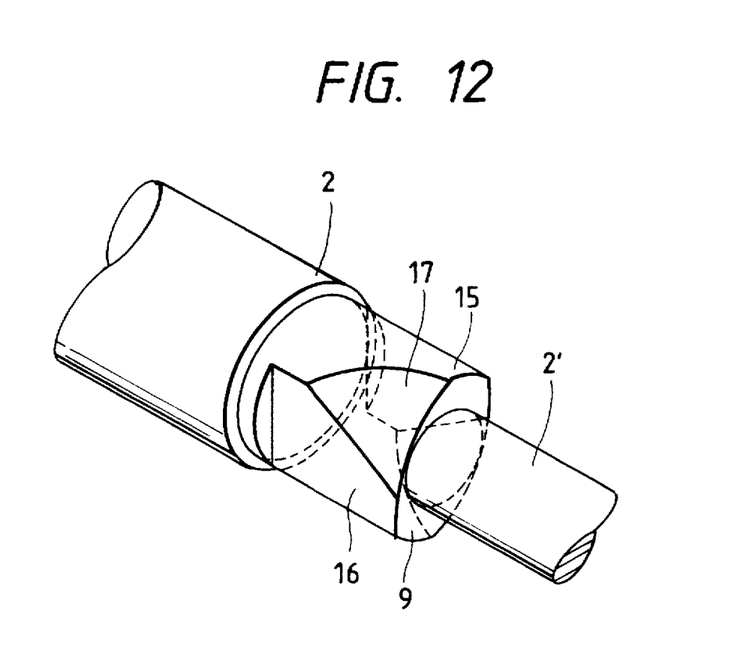
FIG. 12 is a perspective view of the main portions of the second embodiment of the invention.

Further, according to the invention, the chamfered portion may be formed in a curved surface extending continuously between the slitted portion and cylindrical peripheral surface portion of the engaging portion, as illustrated in FIGS. 10–12. This renders it possible to perform the induction and guide operation even more smoothly and easily when the engaging portion of the pinion gear engages with the engaging portion of the spool shaft, as a result the returning and engaging operation of the clutch can also be executed more smoothly, quickly and positively.

Furthermore, if the chamfered portion is formed in a single planar surface extending continuously between the slitted portion and cylindrical peripheral surface portion of the engaging portion, as illustrated in FIG. 13–15 then it becomes possible to simplify the machining for forming the chamfered portion.

Moreover, according to the invention, the outer end edges of the chamfered portion may be formed so as to extend across a wide range of 90 degrees or more, crossing over not only a straight line passing through the center of the cylindrical peripheral portion of the engaging portion of the spool shaft and the axis of the spool shaft but also a straight line intersecting the above straight line at right angles and passing through the axis of the spool shaft as illustrated in, e.g., FIG. 8. As a result, the guiding and engaging operation of the engaging portion of the pinion gear with respect to the engaging portion of the spool shaft can be executed more smoothly and lightly and thus the clutch return operation can be performed smoothly and quickly. The present structure is ideal especially for use in a high speed take-up reel.

In addition, a dimensional relationship between the slitted planar portion 16 and the planar chamfered portion 17 in the embodiment shown in FIGS. 13–15 is preferably set such that an axial length B of a boundary between the planar chamfered portion 17 and the slitted planar portion 16 is greater than one half of an axial length A of the slitted planar portion 16 (B>A/2), and a transverse length B' of the boundary between the planar chamfered portion 17 and the slitted planar portion 16 is greater than one half of a transverse length of the slitted planar portion 16 (B'>A'/2).

What is claimed is:

1. A clutch mechanism for a fishing reel for operatively engaging a pinion gear with a spool shaft to transmit a rotational torque to a spool, said spool shaft having a rotational axis, said clutch mechanism comprising:

a first engagement portion formed in said pinion gear; and a second engagement portion formed in said spool shaft and engageable with said first engagement portion, said second engagement portion comprising:

a first planar surface extending parallel to said axis;

a first cylindrical surface substantially concentric with respect to said axis;

a first chamfered surface located between said planar surface and said cylindrical surface and slanted with respect to a plane orthogonal to said rotational axis; and a second chamfered surface located between said planar surface and said cylindrical surface and slanted with respect to said plane, said second chamfered surface connecting said first chamfered surface to one of said planar surface and said cylindrical surface.

2. A clutch mechanism according to claim 1, wherein said first chamfered surface is planar.

3. A clutch mechanism according to claim 1, wherein said first chamfered surface has a substantially triangular shape extending from a boundary between said planar surface and said cylindrical surface and enlarged toward an axial terminus of said second engagement portion.

4. A clutch mechanism according to claim 1, wherein said spool shaft has a small diameter portion extending from an axial terminus of said second engagement portion and concentric with respect to said axis, and said pinion gear is slidably supported on said small diameter portion so as to operatively engage the first engagement portion with said second engagement portion.

5. A clutch mechanism according to claim 1, wherein said second engagement portion further comprises:

a second planar surface coincident in shape to said first planar surface and arranged symmetric to said first planar surface with respect to said axis;

a second cylindrical surface coincident in shape to said first cylindrical surface and arranged symmetric to said first cylindrical surface with respect to said axis;

a third chamfered surface located between said second planar surface and said second cylindrical surface and slanted with respect to said plane; and a fourth chamfered surface located between said second planar surface and said second cylindrical surface and slanted with respect to said plane, said fourth chamfered surface connecting said third chamfered surface to one of said second planar surface and said second cylindrical surface.

6. A clutch mechanism according to claim 1, wherein, at an axial terminus of said second engagement portion, outer edges of said first and second chamfered surfaces define an arcuate segment corresponding to an angle of more than 90° with respect to said axis, whereby each of said outer edges contacts one of said planar surface and said cylindrical surface.

7. A clutch mechanism according to claim 1, wherein an axial length of a boundary between said first chamfered surface and said planar surface is greater than one half of an axial length of said planar surface, and a transverse length of said boundary is greater than one half of a transverse length of said planar surface.

8. A clutch mechanism for a fishing reel for operatively engaging a pinion gear with a spool shaft to transmit a rotational torque to a spool, said spool shaft having a rotational axis, said clutch mechanism comprising:

a first engagement portion formed in said pinion gear; and a second engagement portion formed in said spool shaft and engageable with said first engagement portion, said second engagement portion comprising:

a first planar surface extending parallel to said axis;

a first cylindrical surface substantially concentric with respect to said axis; and a first chamfered surface located between said planar surface and said cylindrical surface and slanted with respect to a plane orthogonal to said rotational axis;

wherein said spool shaft has a small diameter portion extending from an axial terminus of said second engagement portion and concentric with respect to said axis, and wherein said chamfered surface extends beyond said axial terminus.

9. A clutch mechanism according to claim 8, wherein a minimal radial distance between said chamfered surface and said axis is less than a radius of said small diameter portion.

10. A clutch mechanism according to claim 8, wherein, at said axial terminus of said second engagement portion, outer edges of said chamfered surface define an arcuate segment corresponding to an angle of more than 90° with respect to said axis.

11. A clutch mechanism for a fishing reel for operatively engaging a pinion gear with a spool shaft to transmit a rotational torque to a spool, said spool shaft having a rotational axis, said clutch mechanism comprising:

a first engagement portion formed in said pinion gear; and a second engagement portion formed in said spool shaft and engageable with said first engagement portion, said second engagement portion comprising:

a first planar surface extending parallel to said axis;

a first cylindrical surface substantially concentric with respect to said axis; and a first chamfered surface located between said planar surface and said cylindrical surface and slanted with respect to a plane orthogonal to said rotational axis;

wherein an axial length of a boundary between said chamfered surface and said planar surface is greater than one half of an axial length of said planar surface, and a transverse length of said boundary is greater than one half of a transverse length of said planar surface; and wherein said spool shaft has a small diameter portion extending from an axial terminus of said second engagement portion and concentric with respect to said axis and said chamfered surface extends beyond said axial terminus.

12. A clutch mechanism according to claim 11, wherein said chamfered surface is planar.

13. A clutch mechanism according to claim 11, wherein said chamfered surface is curved.

14. A clutch mechanism according to claim 11, wherein said chamfered surface has a substantially triangular shape extending from a boundary between said planar surface and said cylindrical surface and enlarged toward said axial terminus of said second engagement portion.

15. A clutch mechanism according to claim 11, wherein said pinion gear is slidably supported on said small diameter portion so as to operatively engage the first engagement portion with said second engagement portion.

16. A clutch mechanism according to claim 11, wherein a minimal radial distance between said chamfered surface and said axis is less than a radius of said small diameter portion.

17. A clutch mechanism according to claim 11, wherein said second engagement portion further comprises:

a second planar surface coincident in shape to said first planar surface and arranged symmetric to said first planar surface with respect to said axis;

a second cylindrical surface coincident in shape to said first cylindrical surface and arranged symmetric to said first cylindrical surface with respect to said axis; and a second chamfered surface located between said second planar surface and said second cylindrical surface and slanted with respect to said plane;

wherein an axial length of a second boundary, located between said second chamfered surface and said second planar surface, is greater than one half of an axial length of said second planar surface, and a transverse length of said second boundary is greater than one half of a transverse length of said second planar surface.

18. A clutch mechanism according to claim 11 wherein, at said axial terminus of said second engagement portion, outer edges of said chamfered surface define an arcuate segment corresponding to an angle of more than 90° with respect to said axis.

* * * * *